April 15, 1947.  R. W. RITZERT  2,419,036
RIBBON FEED MECHANISM FOR MANIFOLDING MACHINES
Filed April 28, 1943  5 Sheets-Sheet 1

INVENTOR
ROBERT W. RITZERT
BY
Toulmin & Toulmin
ATTORNEY

April 15, 1947.  R. W. RITZERT  2,419,036
RIBBON FEED MECHANISM FOR MANIFOLDING MACHINES
Filed April 28, 1943  5 Sheets-Sheet 2

INVENTOR
ROBERT W. RITZERT
BY
Toulmin & Toulmin
ATTORNEYS

April 15, 1947.  R. W. RITZERT  2,419,036
RIBBON FEED MECHANISM FOR MANIFOLDING MACHINES
Filed April 28, 1943  5 Sheets-Sheet 3
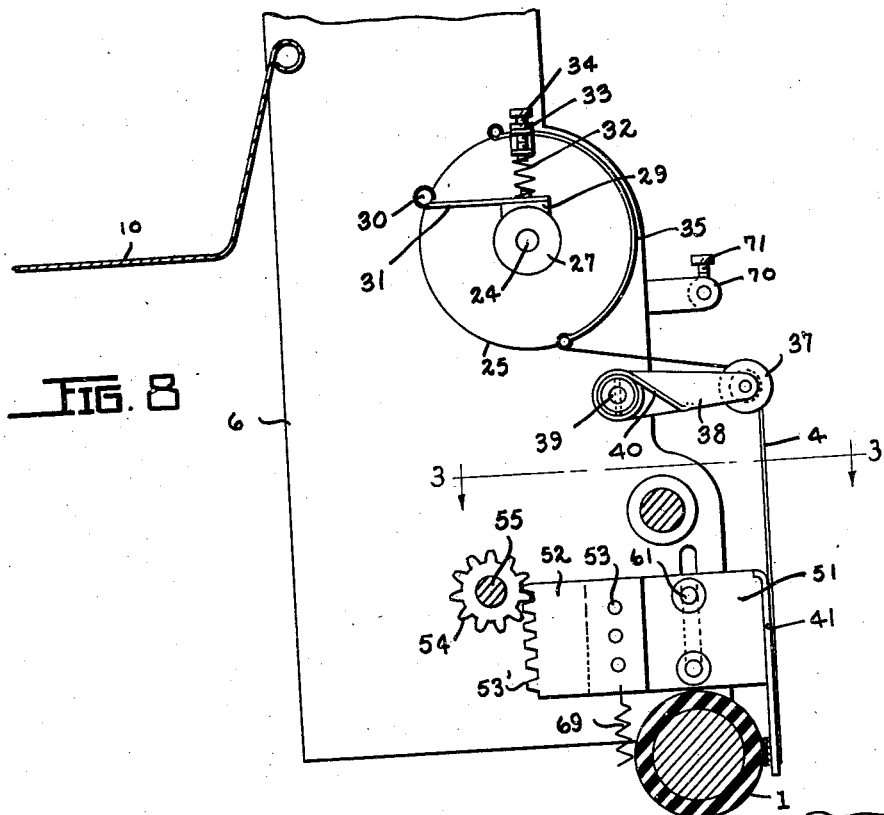
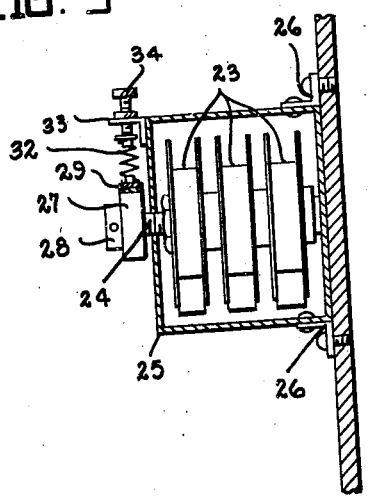
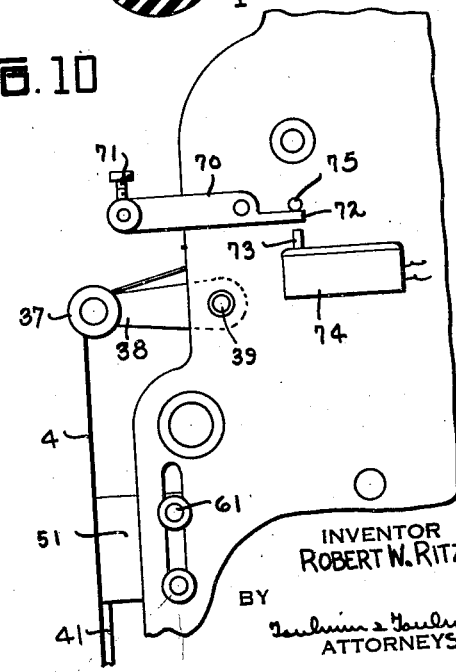
INVENTOR
ROBERT W. RITZERT,
BY
ATTORNEYS April 15, 1947.  R. W. RITZERT  2,419,036
RIBBON FEED MECHANISM FOR MANIFOLDING MACHINES
Filed April 28, 1943    5 Sheets—Sheet 5

INVENTOR
ROBERT W. RITZERT
BY
Toulmin & Toulmin
ATTORNEY

Patented Apr. 15, 1947

2,419,036

UNITED STATES PATENT OFFICE 2,419,036

RIBBON FEED MECHANISM FOR MANIFOLDING MACHINES

Robert W. Ritzert, Dayton, Ohio, assignor to The Egry Register Co., Dayton, Ohio, a corporation of Ohio Application April 28, 1943, Serial No. 484,812

18 Claims. (Cl. 197—126)

1

The present invention relates to manifolding machines, and in particular to such machines which are adapted to make multiple copies of typed or printed material by means of copying ribbons or carbons, particularly those machines used in connection with typing, adding and tabulating machines and the like.

In a typical prior art machine which the present machine represents an improvement thereover, the manifolding attachment is constituted of a framework carrying rollers over which the required number of paper sheets are fed upwardly from the typing or printing platen of the main machine and the finished copies are received in their basket or carrier at the rear of the machine.

The multiple typing or printing effect is provided by a plurality of carbon ribbons or webs which are interleaved between the paper sheets at the position of the platen. These ribbons are caused to move across the paper, i. e. normal to the movement of the paper, during the spacing line interval by means of a pin wheel drive. Thus the carbon ribbons are moved from one side of the paper to the other side in steps corresponding to the line spacing operations of the main typing machine, the separate movements of the ribbons ranging between one-quarter and one-half inch.

However, when the last line has been typed or printed on the paper, an automatic ejection mechanism is brought into the play to move the entire group of paper rapidly upwardly over a considerable distance such that the succeeding sheet of the multiple group of paper lengths is placed in position for the next typing or printing operation. During this ejection spacing feeding operation of the paper webs, the pin wheel which feeds the carbon ribbons across the paper is rotated a plurality of times in order to effect a plurality of steps of movement of the copying ribbons. This quick and sustained movement of the carbon ribbons during the paper ejection operation serves to overcome any tendency for the carbon ribbon to stick to the paper during the time that the paper is moved rapidly across the ribbon. However, a manifolding machine of this type is designed to accommodate paper webs or sheets which are fed to the machine from a folded condition which obviously leaves creases or folds extending across the paper at positions which represent the upper and lower limits of the lengths of each paper web.

It has been found that notwithstanding the tendency for the pin wheel mechanism to pre-

2 vent sticking or adhesion of the carbon ribbon to the paper during the normal line spacing operation, this provision is not entirely satisfactory during the paper eject operation due to the fact that the carbon ribbons are tightly interleaved between the paper webs at the typing position and during this eject operation the folds of the paper must necessarily cross the carbon ribbons, causing these folds to carry the carbon ribbons with them as the paper is moved upwardly into the receiving basket.

In view of the fact that the paper webs move very quickly during this eject operation and over a considerable distance sufficient in order to position the next group of sheets as determined by the distance between the folds into the typing position, there is a tendency for the carbon ribbon to break. This tendency is enhanced in case the ribbon is of the paper rather than the cloth type but in any event this bowing-up effect on the ribbon represents a disadvantage in the efficient operation of the machine.

The primary object of the invention is to provide an improved method and mechanism by which the tendency of the carbon paper ribbon to break or to bow upwardly during the eject movement of folded paper webs is eliminated.

Another object is to provide a mechanism by which frictional contact between the tightly packed carbon ribbon and paper web portions is materially reduced and preferably entirely avoided during the eject movement of the paper webs, i. e. during the time that one length of the paper web (between the folds) is substituted for another length at the typing position.

The general object of the invention is to increase the useable life of carbon ribbons or paper strips which are used in connection with a manifold typing machine, thus reducing the number of breakdowns in the machine and the necessity for continually threading carbon ribbons through the paper webs after a break in one or more lengths of the carbon ribbon.

The invention will be better understood when reference is made to the following description and the accompanying drawings in which:

Figures 4 and 5 are useful in explaining the principles of the invention.

Figure 6:
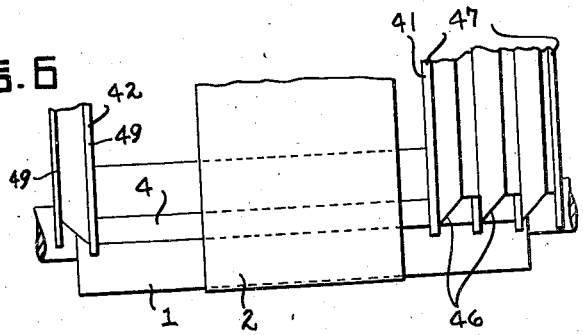
Figure 7:
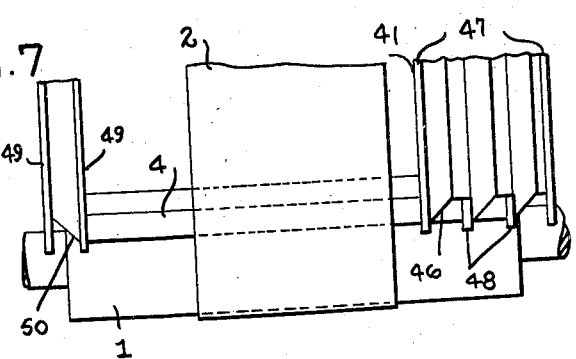

Figure 6 is an elevational view of the platen, turn plates and carbon ribbon assembly in the typing position. Figure 7 illustrates an end view of the platen and carbon ribbon assembly shown during the eject operation. Figure 6 may be considered a view looking toward the left in Figure 4 while Figure 7 is a view looking toward the left in Figure 5.

Figure 1:
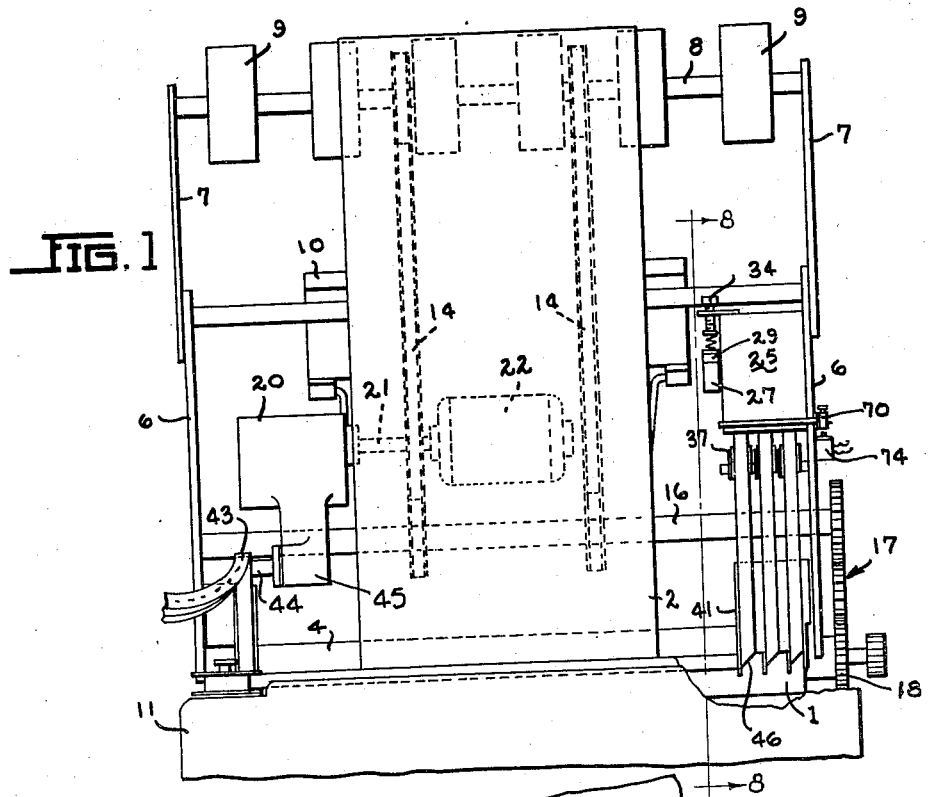
Figure 1 is a front view of the improved manifolding attachment as applied to a commercial form of typing, adding or tabulating machine.

Figure 8 is an enlarged sectional view taken along line 8—8 in Figure 1 and looking in the direction of the arrows to show the innerside of the carbon ribbon drum and also to show details of the carbon ribbon lifting mechanism.

Figure 9 is a vertical sectional view taken through the carbon roll compartment.

Figure 10 is a fragmentary end view of the manifold attachment showing a protective switching arrangement for stopping the paper and ribbon feed during an emergency.

Figure 11:
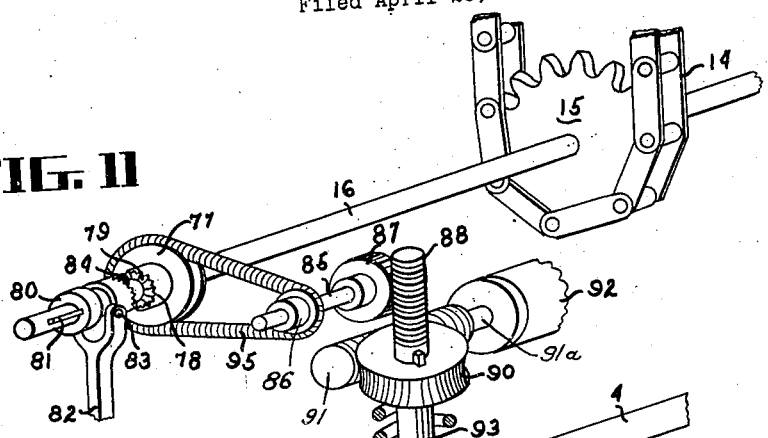

Figure 11 is a perspective fragmentary view of the apparatus immediately associated with the ribbon assembly elevating apparatus and showing in particular the driving mechanism for that apparatus.

Figure 12:
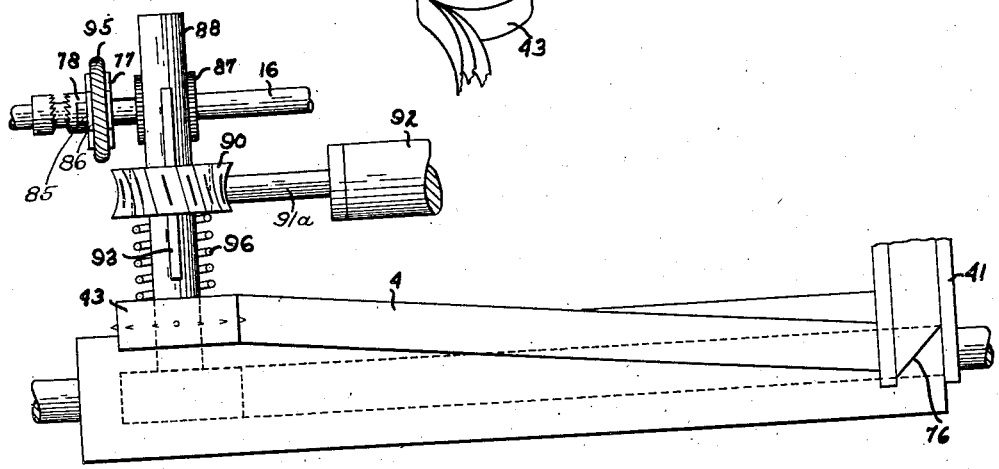

Figure 12 shows in front elevation, the ribbon elevating mechanism of Figure 11.

Figure 13:
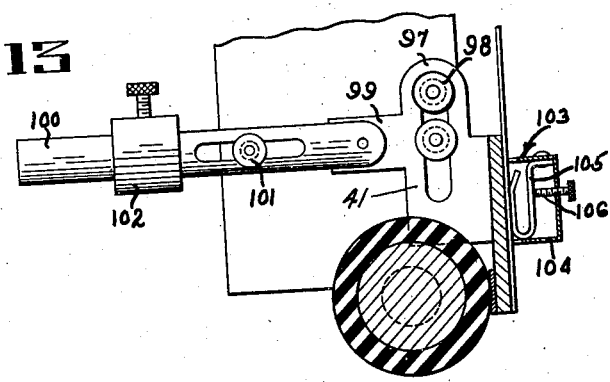
Figure 14:
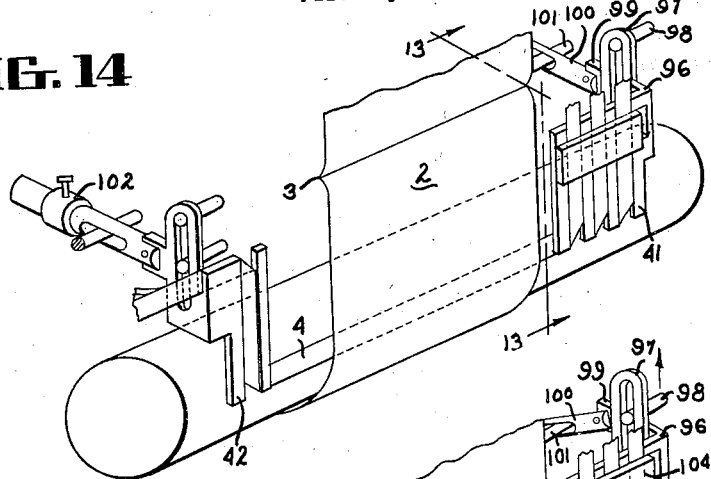

Figure 13 is a view taken at approximately the line 13—13 in Figure 14, showing the resilient clamping plate for holding the carbon ribbon snugly against the multi-grooved plates.

Figure 15:
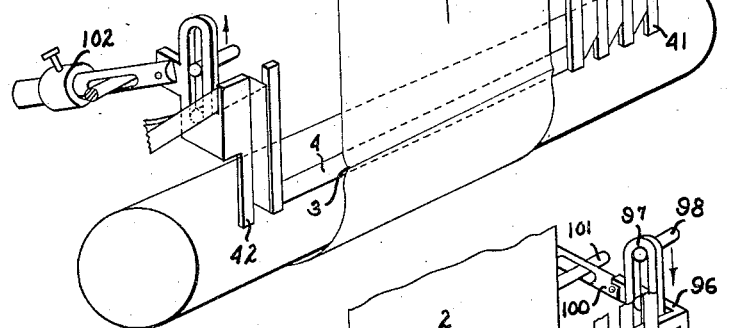
Figure 16:
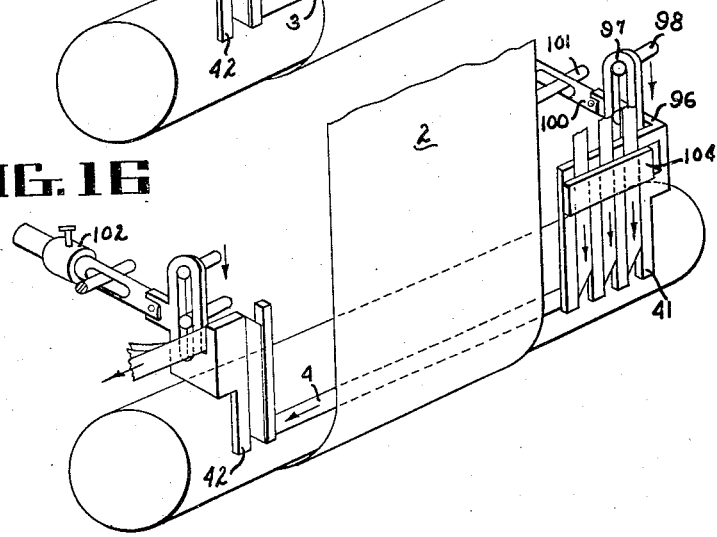

Figures 14, 15 and 16 are diagrammatic showings of the platen turn plates etc. forming part of a modified arrangement of the improved manifold attachment. Figure 14 shows the ribbon assembly in its lowermost position; Figure 15 shows the assembly in its uppermost position after having been raised by frictional contact with the paper web; Figure 16 depicts the final operation of the series in which the ribbon assembly is caused or permitted to return to its lower original position ready for typing.

General arrangement

Figure 2:
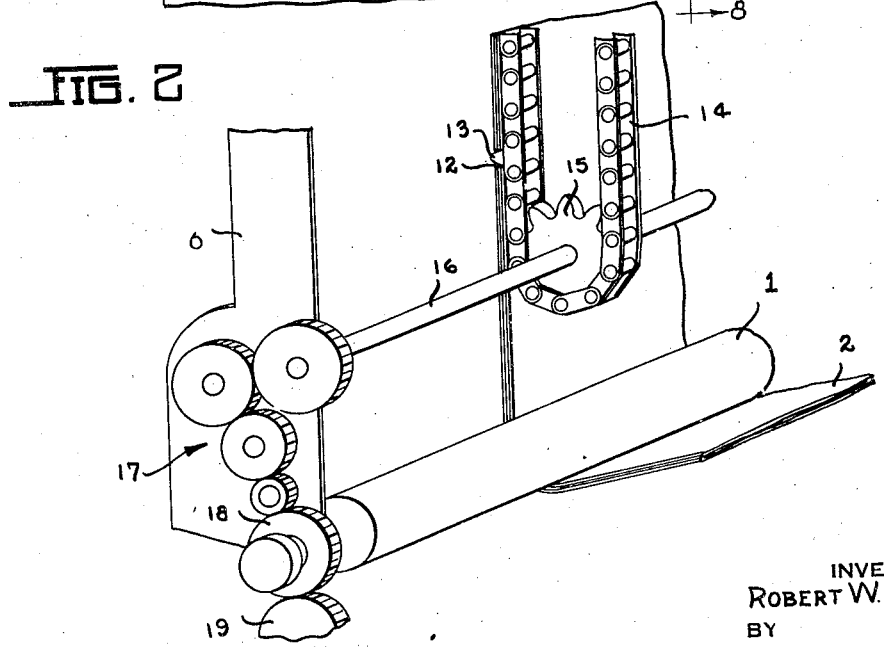
Figure 2 is a perspective fragmentary view, taken from the rear of the paper drive mechanism.

In general, the manifolding machine of this invention as shown in assembly in Figures 1 and 2 is an attachment to be used in conjunction with a main machine adapted to type or print a record, such as a tabulating and listing machine, typewriting machine or adding machine. The main machine ordinarily is provided with its own typing mechanism, including type and a ribbon, together with means for printing a single copy of a record or multiple copies with the use of sheets of carbon paper interleaved between the multiple paper sheets or webs.

Hitherto such carbon sheets were moved with the paper sheets and interfered with the manifolding machine. In the present invention however, the multiple copies of the records are made upon multiple paper webs interleaved with "one-time" copying ribbons between the multiple paper webs and traveling in a direction perpendicular to the direction of motion of the sheets or webs. In this manner, necessity for the use of carbon sheets is eliminated, together with the difficulties of realigning the carbon sheets when occasion requires. The copying ribbons employed in the present invention are made of a cheap material and can be used one time and then discarded. A short strip of the copying ribbon which may consist of a carbon paper ribbon is equivalent to an entire sheet of the carbon paper hitherto employed.

In the manifolding machine of the present invention, the carbon paper ribbons are automatically fed by predetermined steps between the typing operations of successive lines of type, so that this motion of the ribbons breaks up the natural tendency to adhere to the paper forms with which they are interleaved. This ribbon feeding is synchronized with the line spacing mechanism of the main machine to which the manifolding machine is attached and is controlled in accordance with the motion of the line spacing parts of the main machine. Furthermore, certain of such main machines, such as tabulating and listing machines are equipped with mechanisms for automatic ejection spacing of the paper forms; that is, for moving the paper webs a multiplicity of line spacings between successive forms in order to pass from the typing position, at the bottom of one form, to the typing position at the top of the next form. These forms are provided with reversely arranged creases or folds in order more conveniently to be handled and they are presented to the main machine and the manifolding attachment in this manner.

However, the forms are caused to lie flatwise against the vertical framework of the machine during the typing or printing operation and when this operation is completed the forms are fed upwardly over the frame in such a way that they will return to their creased or folded condition and be received by a basket or trough.

Principles of the invention

It has been pointed out that the ribbons are moved a single step during the single line spacing operation. However, when the paper webs were passing through the eject cycle, i. e. when the paper webs were moved upwardly a multiplicity of line spacings between successive forms, it was the practice of the prior art to operate the ribbon feeding mechanism through a plurality of steps and not limit this movement to a single step as in the case of a single line spacing operation. This increased movement of the ribbon feeding mechanism was intended to break the contact between the ribbon and the paper and thus to prevent the ribbon from adhering to the paper and from being carried by the paper upwardly during the eject operation. While this scheme worked out fairly satisfactory, it was found that there was a certain amount of breakage of the carbon paper ribbons caused presumably by adhering to the upwardly moving paper during the eject operation. It will be understood that this adherence is affected by the moisture conditions of the air immediately surrounding the machine and also by the quality and character of the carbon paper ribbon and of the paper webs with which the ribbons are interleaved. There is initially extremely close contact between the paper webs and the carbon ribbons at the typing position and the force struck by the type against the paper and carbon ribbon assembly tends to increase this adhesion.

In accordance with my invention I have discovered that in many instances the breakage of the carbon paper ribbon is not due to the adhesion between the ribbon and the paper throughout the length of each paper form but is brought about almost entirely by the folds or creases in the paper which tend to dig into the carbon strips and thus add a strong gripping force at these particular points. This is exemplified by a comparison between Figures 4 and 5 in which the reference character 1 designates diagrammatically the platen of the machine which receives four layers of paper 2 constituting manifold forms with creases or folds 3 positioned at the top and bottom of each group of forms. As stated hereinbefore, these creases are reversely folded so that the paper is presented to the machine from a stacked condition. Interleaved between the paper forms 2 there is a plurality of carbon paper ribbons 4. It will be understood that there is an additional ribbon (not shown) on the outside surface of the forms and the latter when struck by the type of the machine causes a typed impression to be applied simultaneously to all of the paper forms. It will be noted in Figure 4 that the crease 3 of each of the paper forms 2 is shown just below the carbon ribbon assembly. Now assume that the paper 2 is caused to move upwardly over a considerable distance in order to pass from the typing position, at the bottom of one form to the typing position at the top of the next form.

Under these conditions the creases 3 would, if the carbon ribbons remained stationary be dragged over the ribbons and since these creases represent indentations in the paper with corresponding projections, the latter tend to deform the carbon ribbon and to lock itself to the ribbon. Thus as the paper is pulled upwardly the creases 3 (Figure 4) would also pull upwardly the carbon ribbons 4 and inasmuch as these ribbons are made of paper and are held rigidly at their ends in a manner which will be described hereinafter, the carbon paper would tend to break.

In accordance with the present invention I propose that during the eject operation of the paper forms 2 the carbon ribbons be also caused to move upwardly through a predetermined distance which however is less than the distance over which the paper forms are moved, but a sufficient distance to position the carbon ribbon within a region of the paper forms 2 wherein there exists considerable spacing between the paper forms. Thus in Figure 5 the ribbons 4 have been moved upwardly at least one-half inch into a region where considerable spacing exists between the individual forms 2, this spacing being indicated by the reference character 5. Inasmuch as the packing or close contact effect between the carbon ribbon and the paper forms has been materially reduced by the upward movement of the carbon paper, the paper web 4 can be ejected through any distance and at any speed without causing the carbon paper to adhere to the paper web at the position of the creases which separate the forms from one another. There is therefore positively no tendency for any breakage of the carbon ribbons since the latter are carried upwardly and quite intentionally through only a relatively short distance, much less than the distance through which the paper forms move during the eject operation.

The main machine construction

The main machine with which the present invention is employed forms no part of the invention and may be an adding machine, a tabulating or listing machine or any other suitable machine capable of printing a record. For purposes of illustration a tabulating and listing machine has been disclosed in the drawings.

The rotary platen 1 (Figures 2 and 8) of the main machine is rotatably mounted in the side plates 6 (Figures 1, 2 and 8), these side plates being provided with an upright skeleton frame 7 which is spanned by a shaft 8. A number of rollers 9 may be provided on the shaft, the purpose of these rollers being to support and guide the upper ends of the paper forms during the typing or eject operations. These forms pass over a pair of the rollers 9 (depending on the width of the forms) and drop downwardly into a basket or chute 10 where they automatically fold themselves into the originally provided creases. These forms are fed into the main printing machine and are indicated at 11 in any suitable position and are obviously properly guided during their travel between the platen 1 and the rollers 9. The upward movement of the paper is obtained by providing the latter with openings 12 (Figure 2) into which may be inserted pegs 13 carried by a pair of spaced chains 14 each of which passes around a pair of sprockets 15. The lower two sprockets are carried on a shaft 16 while the upper two sprockets are mounted on the shaft 8. The shaft 16 is connected through a gear train generally indicated at 17 (Figure 2) to a platen gear 18 which in turn meshes with a gear 19 driven through a combined clutch and gear box 20 (Figure 1) and shaft 21 by a motor 22.

It will be understood that this motor also provides the power for operating the main typing or printing machine 11. When the clutch 20 is engaged, the motor 22 will cause the paper forms 2 to pass under the platen 1 as seen in Figure 2 and to move upwardly during the eject or line spacing periods, the paper finally reaching the basket 10 in a completed typed form and arranged as a stack. The duplicate forms are of course arranged with the original forms in the basket.

Carbon ribbon mechanism

Figure 4:
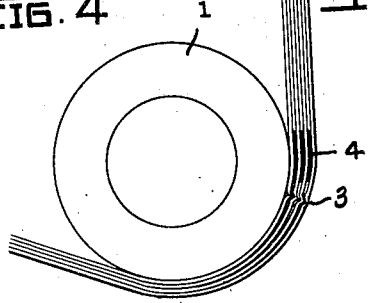
Figure 4 is a diagrammatic end view of the platen and carbon ribbon assembly shown in the typing position.
Figure 5:
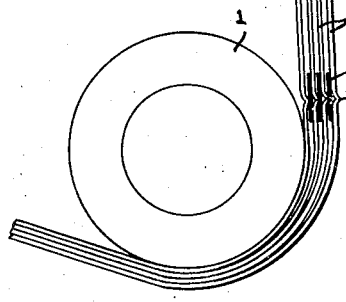
Figure 5 is a view similar to Figure 4 but showing the carbon ribbon assembly after it has been moved upwardly away from the typing position during the eject operation in accordance with our invention.

In the earlier machines when duplication of typing was required it was customary to feed whole sheets of carbon paper between the paper forms as in the case of the usual typewriter arrangement. However, in the present machine whole carbon sheets are eliminated and instead carbon ribbons preferably of paper are employed at the typing position, these ribbons extending laterally across the paper and being moved with respect to the paper in the lateral direction in a manner which will be described during the line spacing operation. In case four sheets of paper forms are being simultaneously typed three strips of carbon ribbon will be interleaved between these sheets of paper, one on top of the other as can be seen in Figure 4 and these carbon ribbons are in addition to a ribbon provided on the outside of the paper which directly receives the imprint of the typing element of the machine.

The ribbon supply may be constituted of a plurality of rolls 23 mounted on a shaft 24 and contained within a casing 25 (Figure 9). The latter is secured as by angle irons 26 to one of the side plates 6 (Figure 1). The shaft 24 is suitably journalled in the casing 25 (Figure 9) and extends beyond the casing to terminate in a drum 27 which may be held on the shaft by a pinned collar 28. There is a brake shoe 29 bearing down on the upper surface of the drum 27, the shoe being pivoted at 30 through an arm 31. A spring 32 is caused to bear against the arm 31, the upper end of this spring being secured to an angle iron projection 33 which may be secured to the casing 25. The tension of the spring may be adjusted by a thumb screw 34 in any suitable manner. Thus by turning the thumb screw, pressure may be applied to the drum 27 by the brake shoe to make more difficult the turning of spools 23. Access to the casing 25 to insert or remove a spool may be had through a large opening which is closed by a semi-cylindrical cover 35 (Figure 8). It will be understood that the spools 23 are separated from one another on the shaft in any suitable manner and are secured thereto, for example, by means of a nut 36.

The casing 25 is provided with a plurality of openings at the bottom through which the carbon ribbon is fed and is taken around a plurality of idler pulleys 37 flanged at each end and supported on individual arms 38 which are pivoted on a rod 39. This rod may be secured in any suitable manner to one of the side walls 6 and is positioned directly below the spool casing 25. Each of the arms 38 is given an upward urge by a torsional spring 40, the strength of which is such that when a normal pull is exercised on the ribbons 4 the arms extend outwardly from the side wall in a horizontal direction as shown.

After leaving the idler pulleys the ribbon extends preferably in a vertical direction downwardly and passes over a so-called turn plate 41 which will be described presently, the purpose of this plate being to receive the ribbons in a vertical plane and separated from one another and then to turn the ribbons through 90° in such a way that the ribbons would normally lie on top of one another as viewed in the horizontal direction. However, these ribbons are initially threaded between the layers of paper so as to have an interleaved relation and they extend throughout the entire width of the multiple layer paper assembly. After leaving the sheets, the paper ribbons maintain their alined positions and are caused to pass upwardly over a turn plate 42 which is somewhat similar to the turn plate 41 and which will also be described in detail, the purpose of this plate being to change the direction of the ribbon assembly from horizontal to vertical while maintaining their alined positions. After leaving the turn plate 42, the ribbon passes over a pin wheel indicated at 43, which is mounted on a shaft 44. The latter is journalled in a housing 45 (Figure 1) which may form part of the clutch and gear box 20 and to which mechanical power is supplied through suitable gearing from said box. Thus when the pin wheel 43 is rotated tension is applied simultaneously to all of the carbon ribbons to cause the ribbon assembly to move in a direction transverse of the paper sheets 2 and the ribbon is automatically fed from the spools 23.

The clutch for controlling the operation of the pin wheel shaft 44 is caused to be engaged in any suitable and well known manner during each line spacing operation of the machine, i. e. when the typing of that particular line has been terminated and the typing carriage is being moved from the right to the left hand side of the paper sheets as is well understood in the art. There is no difficulty in moving the carbon ribbon through the paper sheets as explained hereinbefore and this movement serves not only to bring fresh areas of the carbon paper to bear against the paper at the typing positions but also to break any frictional contact or adherence between the carbon paper and the paper forms.

However, considerable difficulty has been encountered when the paper forms were moved upwardly during the eject operation as when the forms were being fed from the typing position at the bottom of one form to the typing position at the top of the next form by the pin and sprocket chain arrangement 13, 14, 15 shown in Figure 2 and explained hereinbefore. Whereas heretofore it had been considered that the carbon paper adhered to the paper forms throughout the entire area of these forms, I have discovered that this is probably not true but instead the adherence between the moving paper and the stationary carbon ribbons is caused solely by the passage of the creases or folds which separate the forms from one another.

*Ribbon elevating mechanism*

It was pointed out hereinbefore that the ribbons 4 during their travel just prior to passing around the platen 1 are separately guided over a turn plate 41 and after leaving the platen are guided as a group by a turn plate 42 to the position of the pin wheel 43. These respective turn plates are shown in detail in Figures 6 and 7. The turn plate 41 of steel or other suitable metal, the lower edge of which extends to a position just below the typing position on the platen end is provided with a series of serrated edges 46 some of which are angularly directed and others are longitudinally directed. The extreme right and left hand edges of the plate 41 are provided with outwardly extending flanges 47 and a pair of these flanges 48 extends upwardly from the lower edge for a limited distance in order to assist in guiding the carbon paper ribbon around the diagonal edges 46. Thus there is formed in effect, particularly at the bottom of the plate 41 a number of grooves, three as shown, to accommodate the various ribbons so that each of the ribbons are caused to turn the corner at the diagonal edges 46 and the result is that the ribbons are forced to lie on top of one another as a group and in complete alinement. Actually, these ribbons are interleaved with adjacent sheets of the paper so that they pass transversely across the paper and maintain their alined position even though separated by paper sheets.

Figure 3:
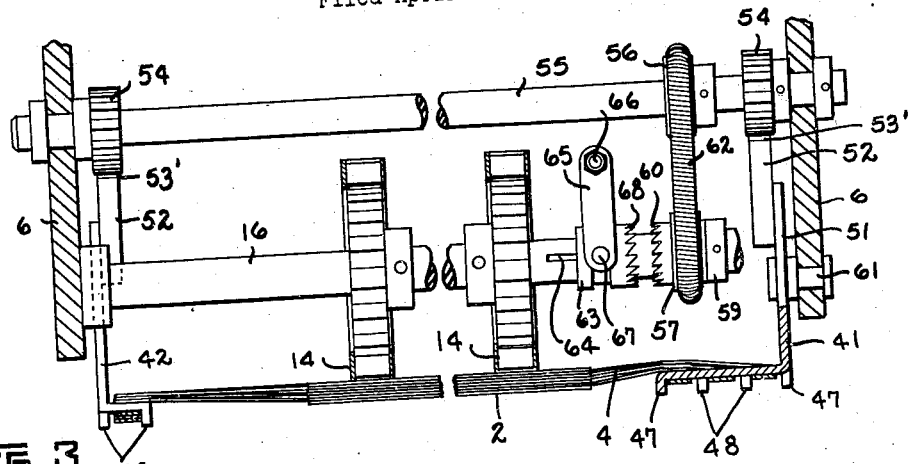
Figure 3 is a horizontal sectional view of the lower portion of the manifolding attachment or machine and showing more particularly the apparatus for moving the carbon ribbon assembly away from the paper during the eject movement. This view is taken approximately on line 3—3 in Figure 8, looking in the direction of the arrows.

The turn plate 42 is constructed similar to the turn plate 41 except only one groove formed by the outer flanges 49 is provided because as the ribbon is caused to pass around the diagonal edge 50, the ribbons maintain their grouped relation, on top of one another and in this manner are presented to the pin wheel 43 (Figure 1). Each of the turn plates 41, 42 is carried by an angularly positioned side plate 51 which bears against the inner surface of the side frame member 6. There is a plate 52 riveted at 53 to each side plate 51 (Figure 3) and the vertical free edge of the plate 52 is provided with a rack 53'. A pinion 54 is adapted to mesh with the teeth of the rack, this pinion being carried on a shaft 55 which extends across the manifolding attachment as can be seen in Figure 3. The shaft 55 is provided with a grooved pulley 56 provided with a collar which is pinned to the shaft and is in line with a similar pulley 57 loosely mounted on a shaft 16. The pulley 57 is held against axial movement along on its shaft by a pinned collar 59 and the pulley is provided at the left with jaw teeth 60 constituting part of a clutch, the purpose of which will be described presently.

The turn plates 41 and 42 are provided with bolts 61 which pass through vertical elongated slots in the side plates 6 in order to permit each of the turn plates to be raised and lowered by the clutch 60 as will also be explained. A belt 62 preferably made of wire spring material passes over and connects the pulleys 56 and 57. The shaft 16 carries a grooved collar 63 which is adapted to slide longitudinally over the shaft and is provided with an axially extending key (not shown) which engages a keyway 64 so that the collar 63 is caused to rotate with the shaft 16. There is a lever 65 pivoted at 66 which terminates in a pin 67, this pin being adapted to ride in the groove of the collar 63 (Figure 3). The right hand end of the collar 63, as seen in Figure 3 terminates in teeth 68 which are adapted to engage the teeth 69 of the clutch pulley 57 when the collar 63 is moved to the right.

The shaft 17 derives rotative power through the clutch and gear box 20 from the motor 22 and therefore turns during line-spacing and ejecting operation of the machine. As the result, the collar 63 is caused to rotate. Now assume that the lever or arm 65 is rotated about its pivot counterclockwise so that the teeth of the collar engage the teeth 69 of the clutch. The rotative effort of the shaft 16 will be communicated to the shaft 55. Now assume that the lever or arm 65 is connected to any element of the main typing machine which would actuate the lever during the eject operation, i. e. during the period that successive paper forms are passed from the typing position at the bottom of one form to the typing position at the top of the next form. Many standard types of tabulating and listing machines or typewriting machines, particularly those sold by "IBM" would provide such an actuating element. Further assume that the lever 65 is swung to the right as seen in Figure 3 which causes the shaft 55 to rotate as explained above. The gears 54 in each side of the machine, in meshing with the racks 53' would cause the turn plates 41 and 42 to move upwardly and carry with them the series of ribbons. The effect thus obtained would be equivalent to that shown in Figure 5 in which the ribbons 4 were moved upwardly from the point of tangency with the platen 1 as to move the ribbons to a position where the paper webs are spaced a considerable distance apart. This upward movement of the ribbons preferably takes place during the start of the eject operation and the arrangement is such that the ribbons and the paper move upwardly at the same rate during the initial periods of the eject operation after which the paper webs continue their upward movement to a distance necessary to substitute one group of forms for another at the typing position.

It is apparent that inasmuch as the ribbons are now positioned at a place where the paper webs lie very loosely against one another (see Figure 5) the continued movement of the paper webs as when the creases or folds 3 pass the ribbons would no longer cause these creases to dig into or otherwise adhere to the ribbons in passing. Thus the ribbons maintain their elevated position during the entire eject operation and there is no tendency for these ribbons to break while the creases of the paper webs are passing thereover. The upward movement of the turn plates 41, 42 is limited by the vertical grooves in the side plates 6 (Figure 8) so that notwithstanding a continued rotation of the shaft 16 and perhaps a continued meshing of the teeth 69, 68 of the clutch, the turn plates can move upwardly only a predetermined limited distance. The belt 62 (Figure 3) is of a character as to permit the necessary slippage when desired.

When the eject operation is terminated the clutch is disengaged by returning the arm 65 to its original position so that the shaft 55 stops rotating. The tension springs 69 are provided to move the turn plates downwardly which can readily be accomplished because the pulley 57 is now loose on the shaft 16. Thus the horizontal portion of the ribbon group is caused to move upwardly at each end through a predetermined distance during the initial period of the eject operation and the ribbon group is held in that position throughout the remainder of the eject operation after which the turn plates 41, 42 are caused to descend and thus to position the group of ribbons in place for the next typing or printing operation.

While the elevation of the ribbons under the circumstances prevents breakage of the carbon paper, there is provided as an additional precaution a mechanism which would stop the machine on the breakage of one or more of the carbon ribbons. This mechanism is shown in Figures 8 and 10. Directly above the swingable arm 38 there is a lever 70 pivoted to one of the side plates 6. This lever extends approximately horizontally and the outer end is provided with a screw 71 which can be so adjusted that should the arm 38 be caused to swing upwardly as the result of one or more of the ribbons breaking, the lever 70 is also swung upwardly about its pivot.

The inner end of the lever 70 is provided with a contact member 72 which is positioned directly above the spring pressed rod portion 73 of an electrical switch 74 of any suitable and well known type. The arrangement is such that when the arm 70 swings upwardly the circuit within switch 74 is opened and this circuit is connected in series with the armature of the motor 22 so that the motor becomes de-energized. Thus the entire machine including all the feeding mechanisms is stopped and will remain in this condition until the carbon ribbon has been rethreaded over the pulleys 37 and through the paper webs 2 to the pin wheel 43. The arm 70 is held at such a horizontal position by means of a pin 75 as not to interfere with the momentary oscillations of the arm 38 which serves to take up the slack in the ribbons during normal operation of the machine. As explained hereinbefore the ribbons are also maintained in a taut condition by the braking effect exercised on the ribbon spools as was explained in connection with Figure 8.

*Modification of Figures 11 and 12*

In general, this modification of the invention provides for a movement upwardly of only one end of the combined carbon paper assembly during the eject operation and thus distinguishes from the earlier described machine in which both ends of the carbon paper ribbon assembly are moved vertically through the same distance. In Figures 11 and 12 the left hand turn plate 42 is discarded and the carbon paper ribbon or ribbons are applied directly to the pin wheel as can be seen in Figure 12. The right hand turn plate 41 has been diagrammatically illustrated as a single grooved element having a diagonally extending edge 76 although it will be understood that as many grooves and as many edges may be provided as there are ribbons to be accommodated in accordance with the description of the earlier figures.

In Figure 12 the turn plate 41 is rigidly fixed because as pointed out immediately above only one end of the carbon paper assembly is elevated, the opposite end always remaining at the typing position. The sprocket wheel shaft 16 (Figure 11) is provided with a grooved pulley 77 which has an outwardly extending collar 78 provided with clutch teeth 79. There is a grooved collar 80 adapted to slide longitudinally of the shaft 16 but keyed for rotation purposes as indicated at 81 at the shaft. A bifurcated lever 82 provided with pins 83 is adapted to engage the groove in the collar 80. The right hand or inner end of the collar is provided with teeth 84 which are adapted to mesh with the clutch teeth 79 when the lever 82 is swung to the right as will be explained hereinafter. There is a shaft 85 positioned adjacent to the shaft 16 and parallel therewith, this shaft carrying at one end a grooved pulley 86 and at the other end a toothed roller 87. The latter is adapted to engage the teeth of a circular rack 88 which is vertically disposed and forms part of a rod 89 which carries at its lower end the pin wheel 43. There is a gear 90 through which the rod 89 may slide, this gear having a concave surface about its periphery and on which teeth are formed. A horizontally disposed worm 91 is adapted to mesh with the teeth on the gear 90, this worm being driven by a shaft 92. A key 93 is secured to the rod 89 and passes through the gear 90 in order not only to rotatably lock the rod 89 and the gear together but to permit the rod to slide through the shaft. There is a compression spring 94 positioned between the underside of the gear 90 and the upperside of the pin wheel 43. The position of this spring will be apparent as the operation is described.

Assuming that the shaft 16 is given a continuous rotation causing the collar 80 to rotate due to the key 81 and further assuming that the lever 82 has been swung to the right (as seen in Figure 11) to cause the teeth 79 and 84 to engage. Under these conditions the pulley 77 is caused to rotate and to transmit this rotative effort through a steel spring belt 95 to the collar 86 causing the gear 87 to rotate. If the latter rotates counterclockwise as viewed from the left of the figure the circular rack 88 is caused to move upwardly and to carry with it the pin wheel 43. The gear 90 is not permitted to move with the rod 89 but is caused to remain in a stationary horizontal position in any suitable and well known manner. The pin wheel 43 however, is given a rotary effort through the shaft 92 and the worm gear 91 and continues to rotate while moving upwardly as the result of the rotation of the gear 87. A suitable stop (not shown) is provided to limit the distance over which the pin wheel moves in the vertical direction and as in the case of the other form of the apparatus described hereinbefore, the belt 95 is adapted to slip on the pulleys 77 and 86 when the rod 89 has reached its uppermost position assuming that the clutch teeth 79, 84 are still engaged. The lever 82 may be connected to any element forming part of the main printing or typing machine which would give the lever a right hand movement at the start of the eject operation.

Thus, the left hand end of the carbon ribbon assembly is elevated as shown in Figure 12 through a predetermined distance leaving the right hand end stationary about the turn plate 41 and the result of this action is to move the ribbon assembly, at least for the most part into a position at which there is considerable spacing 5 between the paper webs. It is apparent that inasmuch as one end of the ribbon assembly remains stationary the other end which passes around the pin wheel must move through a greater vertical distance than was the case in Figures 1, 6 and 7 in which both ends of the ribbon are moved through equal distances.

At the end of the eject operation the shaft 16 becomes stationary and regardless of whether or not the clutch teeth 79, 84 have been disengaged at this time, the compression spring 94 will force the pin wheel downwardly to its initial position. This is due to the fact that the now compressed spring 94 overcomes the frictional resistance of the belt on the pulleys 77 and 86. The pulley 86 partially slips on and partially rotates the belt 95 which latter slips on the pulley 77 as heretofore explained. The shaft 89 and its key 93 slide downwardly with reference to gear 90. The gear wheel 87 would obviously be rotated during this reverse operation and the necessary slippage can be accommodated at the collar 86. It is obvious that inasmuch as the ribbons are caused to take generally speaking a diagonal path in moving upwardly or downwardly a chopping or wedging action is obtained which facilitates the movement of the ribbon assembly with respect to the interleaved paper webs.

It is evident that as in the case of the earlier figures, when the carbon ribbons are moved upwardly to a position where there is considerable spacing between the paper webs, enough clearance or looseness of contact is provided between the carbon ribbon and the creases or folds 3 which would avoid having the carbon ribbon adhere to the paper webs at these creases during the eject operation.

While I have described the feature of moving only one end of the carbon ribbon assembly upwardly, leaving the other end stationary, if desired the turn plate 41 may also be made to move upwardly through a gear and rack mechanism 54, 53' as was described in connection with Figure 3 in order that both ends of the ribbon may be moved upwardly throughout the same distance. Likewise, the pin wheel 43 and its associated mechanism shown in Figures 11 and 12 could be substituted for the movable turn plate 42 and its mechanism shown in Figures 3, 6 and 7 in order to elevate the left hand end of the carbon ribbon assembly.

The modified structure shown in Figures 13 to 16 inclusive

During the course of my research, I have discovered that it might be entirely feasible to eliminate the power mechanism for elevating either one or both ends of the ribbon assembly and to rely for this movement solely on the driving action of the paper webs as they are being moved during the eject operation. Now this can be brought about by accurately counterbalancing the turn plates 41, 42 so that it would take little or no effort to elevate these plates at the same time that the paper webs were moving upwardly during the eject operation. Referring to Figure 14, the turn plate 41 is provided with a rectangular extension 96 in which a vertically extending slotted element 97 is provided. The slot of this element receives a pair of rigidly positioned pins 98 one of which as seen in Figure 14 is located at the upper end of the slot and the other is positioned about the middle of the slot. The purpose of these pins is to permit the turn plate 41 to move vertically upwardly and considerable play is left between the pins and their slot.

The element 97 is provided with a rectangular projection 99 into which is pivoted a bar 100 which extends to the rear of the machine. The bar is pivoted intermediate its length on a rigidly positioned rod 101 and the outer end of the bar carries a collar 102 which is adjustably slidable along the bar. This collar is so adjusted that the weight of the turn plate and the element 97 are exactly counterbalanced about the fulcrum or rod 101. Thus it takes little or no effort to raise the turn plate 41 about the pivot point or rod 101. The same structure as was described in connection with the turn plate 41 may also be employed in connection with the turn plate 42. Figure 14 shows the turn plates 41, 42 in the typing position and carrying a plurality of carbon ribbons along the typing or printing position as was explained in connection with Figures 6 and 7. However, during the eject operation the paper webs 2 are caused to move upwardly in a well known manner carrying with them the creases or folds. When these creases engage the lower edge of the ribbons with which they are interleaved, the ribbons are caused to move upwardly carrying with them the turn plates 41 and 42, assuming that the latter had been very accurately counterbalanced as explained hereinbefore. The ribbons are therefore moved at the same rate as the creases to a position at which there is considerable space between the paper webs and are brought to a stop at that position by any suitable and well known mechanism.

Since the friction between the carbon ribbon and the paper has been eliminated at this upper or second position of the ribbons, the creases or folds are permitted readily to pass the ribbon without causing any breakage thereof. At the end of the eject movement, the paper webs become stationary so that there is no longer any upward urge exerted on the ribbon and the latter is permitted to move downwardly into its initial typing position. This can be conveniently accomplished by so arranging the balance of the turn plates about the fulcrums 101 that these plates normally tend to seek their lower positions which they do immediately upon stoppage of the upward movement of the paper webs.

While a braking device 29 (Figure 8) and a tensioning device 33 may be employed to keep the ribbon taut, this drag effect may be such as to interfere with the balance adjustment of the turn plates about the fulcrum 101. Consequently in this case we prefer to employ a spring clamping arrangement 103 shown more clearly in Figure 13. This structure may comprise a boxlike casing 104 which extends over the entire width of the turn plate 41 and contains a series of U-shaped springs 105, the flat face of which bears against the individual ribbons. Openings are provided in the top and bottom sides of the box to permit ready movement of the ribbon through the box to be subjected to the clamping effect of the springs. The latter may be adjusted from the exterior of the casing by screws 106 in order to provide the necessary tension or drag on the ribbon as the pin wheel 43 is rotated. It is apparent that this drag producing device might advantageously be used in place of the brake 29 and the swing arm 38 in the structure shown and described in connection with Figure 8. However, as was pointed out hereinbefore the swing arm method of introducing a drag offers the additional advantage of opening or closing a circuit when one or more of the ribbons break as was explained in connection with Figure 10.

From the foregoing it is evident that I have shown various ways and apparatus for moving a carbon ribbon assembly away from the typing position to a position at which there is little or no contact between the ribbon and the paper webs in order to permit the creases in the webs to pass the ribbon without causing fracture. Another outstanding feature of this invention is in providing a direct path for the carbon ribbon from the spool compartment 45 to the pin wheel 43 by means of the turn plates 41, 42. It is apparent that the more direct this path is over which the ribbon travels and the shorter the distance between the ribbon supports the less likelihood is there of causing the ribbon to break.

It will be understood that I desire to comprehend within my invention such modifications as come within the scope of the claims.

Having thus fully described my invention, what I claim as new and desire to secure by Letters Patent is:

1. A manifold typing machine comprising typing apparatus including a platen, means for moving paper in multiple sheet form over the platen, a plurality of carbon ribbons interleaved with said paper sheets at the typing position, means for moving the ribbons in superposed relation crosswise of the sheets during the line spacing and eject operations of the machine, and means responsive to at least one of said operations for moving the ribbons lengthwise of said sheets and thereafter automatically returning them to said typing position.

2. A manifold typing machine comprising typing apparatus including a platen, means for moving paper in multiple sheet form over the platen, a plurality of carbon ribbons interleaved with said paper sheets at the typing position, means for feeding the ribbons in superposed relation and for giving the carbon ribbons a direction parallel to the opposite edges of the paper sheets, said means also serving to give the ribbons a direction crosswise of the sheets at the interleaving position so that the ribbon changes its direction from the vertical to the horizontal at the corresponding edges of the sheets and from the horizontal to the vertical at the opposite edges of the sheets, means for moving the ribbons during the line spacing and eject operations of the machine, and means responsive to at least one of said operations for moving the crosswise portions of the ribbons in a direction lengthwise of the paper sheets and thereafter automatically returning said portions to typing position.

3. In a manifold typing machine having a platen and typing apparatus, first means operable to move a plurality of superposed sheets over said platen in one direction for line spacing and ejecting movements, second means adapted to guide a plurality of ribbons interleaved with said sheets transversely thereacross at the typing position and in superposed relation and also to shift said ribbons in said one direction, and means responsive to at least one of said movements to actuate said second means to translate said superposed ribbon sections in said direction and thereafter automatically return said sections to typing position.

4. A manifold typing machine comprising typing apparatus including a platen, means for moving paper in multiple sheet form over the platen, a plurality of carbon ribbons interleaved with said paper sheets at the typing position, means for supporting the ribbons at one edge of said sheets, said means serving to give the ribbons a direction crosswise of the sheets, means including a pin wheel for moving the ribbons crosswise of the sheets during the line spacing and eject operations of the machine, means for moving said pin wheel lengthwise of the sheets during at least one of said operations whereby the ribbons are shifted away from the typing position.

5. A manifold typing machine having a platen and typing mechanism, first means for moving a plurality of superposed sheets longitudinally across said platen in line spacing and sheet ejecting movements, second means guiding a plurality of ribbon sections transversely of said sheets and interleaved therewith at the typing line, said second means being movable in the direction of the sheets, means responsive to operation of said first means for synchronously moving said second means for a limited distance only, whereby said sheets and sections are moved as a unit for said distance, and means effective on completion of longitudinal movement of said sheets for positively moving said sections reversely into the typing line.

6. A manifold typing machine comprising a typing apparatus including a platen, a plurality of paper webs provided with reversely occurring folds which divide the webs into manifolded forms, a plurality of carbon coated strips interleaved with the paper webs at the typing position, means for moving the webs with respect to the platen to substitute one multiple group of forms for another group, means for moving the interleaved strips transversely away from the platen during the web feeding operation and into a position where the strips and the creases only loosely contact with the paper webs, said last mentioned means including apparatus by which both ends of the interleaved strips are moved longitudinally a limited distance with the paper webs and through equal distances and means operable upon discontinuance of said feeding operation to return said strips in unison to the typing line.

7. A manifold typing machine comprising a typing apparatus including a platen, a plurality of paper webs provided with reversely occurring folds which divide the webs into manifolded forms, a plurality of carbon coated strips interleaved with the paper webs at the typing position, means for moving the webs with respect to the platen to substitute one multiple group of forms for another group, and means for moving the interleaved strips transversely away from the platen during the web feeding operation and into a position where the strips and the creases only loosely contact with the paper webs, said last mentioned means including mechanism for pulling the carbon coated strips crosswise of the paper webs, said mechanism being adapted to be moved in a direction longitudinal of the paper webs whereby the interleaved strips are caused to pass in a diagonal direction crosswise of the paper during the web feeding operation.

8. A manifold typing machine comprising a typing apparatus including a platen, means for feeding paper in multiple sheet form over said platen, a plurality of carbon paper strips interleaved with the paper sheets at the typing position, means located at the edges of the paper sheets for presenting the strips to the sheets in a vertical direction and for receiving the strips from the paper sheets in a vertical direction, said means including turn plates, means responsive to operation of said feeding means for moving said turn plates to shift said interleaved strip sections for a limited distance with said paper during at least one of the line spacing and eject operations of the machine and moving said plates to return said strip sections to the typing line upon discontinuance of said operation.

9. A manifold typing machine comprising typing apparatus including a platen, means for feeding paper in multiple sheet form over said platen, a plurality of carbon paper strips interleaved with the paper sheets at the typing position, means located at the edges of the paper sheets for presenting the strips to the sheets in a vertical direction and for receiving the strips from the paper sheets in a vertical direction, said means including turn plates, said turn plates being carried on pivoted supports and counterbalanced in such a manner that as the paper tends to move with respect to the carbon coated strips the movement of the paper carries the strips and the turn plates upwardly in order to move the point of support of the carbon strips at each edge of the paper sheets during the line spacing and eject operations of the machine.

10. A manifold typing machine comprising typing apparatus including a platen, first means operable to feed over and across said platen, a plurality of paper webs provided with reversely occurring folds which divide the webs into manifolded forms, second means supporting and guiding a plurality of carbon coated strips interleaved with the paper webs adjacent and past the typing position, including a multi-grooved turn plate for changing the direction of the individual strips from lengthwise to a direction transversely across the paper webs in superposed relation, said turn plate being positioned adjacent one of the edges of the paper webs, said second means also including a turn plate positioned at the opposite edge of the paper webs for receiving the strips in stacked form and changing their direction while in stacked form to a direction longitudinal of the paper webs, and means for moving at least one of said turn plates away from the platen during at least one of the line spacing and eject operations of the machine in order to move the strips to a position where the paper webs are loosely spaced from one another and thereby to permit the webs freely to pass the strips during said line spacing and eject operations.

11. In a manifold typing machine having a platen and typing mechanism, first means operable to move a plurality of superposed sheets to be typed past a typing position on said platen in line spacing and ejecting movements, second means for guiding a plurality of superposed carbon coated strips interleaved with said sheets, over said typing position transversely of said sheets, said second means including a turn plate having notches to turn said strips from side by side relation through an angle, into superposed relation between and transversely across said sheets, said second means also including a second turn plate having a notch to receive and turn said superposed strips, third means mounting said plates at opposite side edges of said sheets for limited movement substantially in the direction of movement of said sheets, and means responsive to operation of said first means to move said plates interleaved strip sections simultaneously with corresponding movement of said sheets, and means operable automatically to return said strip sections to typing position when the movement of the sheets ceases.

12. A manifold typing machine comprising typing apparatus including a platen, means for moving paper in multiple sheet form over the platen, a plurality of carbon ribbons interleaved with said paper sheets at the typing position, a multi-grooved turn plate positioned at one edge of said sheet form for receiving carbon ribbon in edge to edge relation and for presenting the ribbon in stack form to the paper sheets, means including a pin wheel over which the stack of ribbons passes for pulling the ribbons through the interleaved paper sheets during the line spacing and eject operations of the machine, and means for moving at least one of the pin wheel mechanisms and the turn plate during at least one of said operations of the machine in order to move the ribbon stack longitudinally of the paper sheets to a position where considerable space exists between the sheets and thus to permit the paper sheets to be moved crosswise of the ribbons during one of said machine operations without causing fracture of the ribbons.

13. A manifold typing machine comprising typing apparatus including a platen, first means for moving paper in superposed sheet form over said platen, second means engaging and guiding a plurality of carbon ribbons transversely across and in interleaved relation with said sheets at the typing position, swiveled idler pulleys over which the respective carbon ribbons pass prior and subsequent to passage between said sheets, means urging movement of said pulleys in ribbon-tensioning direction, means responsive to operation of said first means to move said second means and ribbon sections guided thereby with said sheets for a limited distance only away from typing position, and means effective on cessation of movement of said sheets to restore said second means and ribbon sections to original position.

14. A manifold typing machine comprising typing apparatus and a platen, means for moving paper in multiple sheet form over said platen, means at each end of said platen for supporting and guiding a plurality of carbon ribbons in interleaved relation with the sheets of said form for movement thereacross at the typing position, means moving said supporting and guiding means during the ejecting operation of the machine to thereby move the interleaved sections of said ribbons away from said platen, said last-named means including a rack connected with said supporting and guiding means and a pinion in mesh with said rack, and means responsive to at least one of the line spacing and eject operations of the machine connected to rotate said pinion.

15. A manifold typing machine comprising typing apparatus including a platen, means for moving paper in multiple sheet form over the platen, a plurality of carbon ribbons interleaved with said paper sheets at the typing position, means for moving the ribbons cross-wise of the sheets during the line spacing and eject operations of the machine, said last mentioned means including a pin wheel, means for presenting the carbon ribbons from a source of supply to one edge of the paper sheet form remote from said pin wheel, and means for moving at least one of said presenting means and said pin wheel lengthwise of the paper sheets during at least one of the line spacing and eject operations of the machine, said last mentioned means comprising a gear and rack mechanism which is under the automatic control of at least one of the line spacing and eject operations of the machine.

16. A manifold typing machine comprising typing apparatus including a platen, means for moving paper in multiple sheet form over the platen, a plurality of carbon ribbons interleaved with said paper sheets at the typing position, means for moving the ribbons crosswise of the sheets during the line spacing and eject operations of the machine, said last mentioned means including a pin wheel, means for presenting the carbon ribbons from a source of supply to one edge of the paper sheet form remote from said pin wheel, and means for moving at least one of said presenting means and said pin wheel lengthwise of the paper sheets during at least one of the line spacing and eject operations of the machine.

17. A manifold typing machine comprising typing apparatus including a platen, first means for moving paper in multiple sheet form over said platen, second means for moving a plurality of carbon ribbons interleaved with and across said paper sheets at the typing position, including a pin wheel, said second means being normally urged into position to locate said ribbons in typing position and being movable away from said platen, and means responsive to operation of said first means, for moving said second means together with the interleaved sections of the ribbons simultaneously with said sheets for a limited distance and for returning said sections to typing position immediately upon cessation of the operation of said first means.

18. In a manifold typing machine having a platen and typing apparatus, power operated means controllable to feed a plurality of superposed sheets across said platen in a direction longitudinally of said sheets for line space and ejecting movements, guide means mounted adjacent opposite side edges of said sheets to guide a plurality of carbon ribbons transversely across and interleaved with said sheets at the typing position, means mounting said guide means for limited movement in said direction whereby the interleaved sections of said ribbons are correspondingly moved away from typing position on ejecting movements, and means responsive to operation of said power operated means for so moving said guide means, and tensioning means for said ribbons.

ROBERT W. RITZERT.

REFERENCES CITED

The following references are of record in the file of this patent:

UNITED STATES PATENTS

| Number | Name | Date |
|---|---|---|
| 1,251,286 | Rodman | Dec. 25, 1917 |
| 1,172,538 | Kurowski | Feb. 22, 1916 |
| 1,564,861 | Kurowski | Dec. 8, 1925 |
| 1,891,567 | Michelsen | Dec. 20, 1932 |
| 2,128,267 | Sacerdote | Aug. 30, 1938 |
| 2,202,958 | McFarland | June 4, 1940 |
| 2,267,046 | Sargent | Dec. 23, 1941 |
| 2,127,812 | Gabrielson | Aug. 23, 1938 |
| 2,000,100 | Sherman | May 7, 1935 |
| 1,302,169 | Johnson | Apr. 29, 1919 |
| 2,248,188 | Pfeiffer | July 8, 1941 |
| 2,070,042 | Copeland | Feb. 9, 1937 |